UNITED STATES PATENT OFFICE.

WILLIAM ELMER, OF NEW YORK, N. Y.

MANUFACTURE OF ILLUMINATING-GAS.

Specification forming part of Letters Patent No. 45,915, dated January 17, 1865.

*To all whom it may concern:*

Be it known that I, WILLIAM ELMER, M. D., of the city, county, and State of New York, have invented certain new and useful Improvements in the Manufacture of Illuminating-Gas; and I do hereby declare that the following is a full, clear, and exact description of the same.

In order that the nature and extent of my invention may be fully understood, I deem it proper to make a brief statement of the nature of bituminous coal, which is the gas-stock most generally used for the manufacture of illuminating-gas, and of the effect of heat upon it. Bituminous coal is a compound substance composed of certain elementary constituents, of which the most important are carbon, hydrogen, and oxygen. It also contains small quantities of nitrogen and sulphur and more or less earthy matter. Illuminating-gas, as usually produced, is a compound of carbon and hydrogen, or, more properly speaking, a mechanical mixture of various chemical compounds of carbon and hydrogen, of which olefiant gas is the most valuable. Hence the carbon and hydrogen of the coal are valuable for the manufacture of illuminating-gas, while the oxygen, nitrogen, and sulphur are injurious, as they impair the purity of the product by combining with a portion of the carbon or hydrogen to form chemical compounds which do not yield light, and some of which, if not removed, are noxious; but carbon and hydrogen combine in many proportions, some of which are gaseous at ordinary temperatures, while others are oily or etherial liquids, or have the form of etherial vapors, and those compounds which are gaseous contain a less proportion of carbon than those which are liquid or vaporous. Compounds in all these forms can be produced from bituminous coal by the application of heat, which effects certain changes in the combinations of its elementary constituents; but the nature of the product varies with the degree of heat employed. If, for example, the coal be distilled in the dry way in a retort at the lowest temperature required to disorganize it and drive off the volatile substances produced, the hydrogen passes off in chemical combination with so great a proportion of the carbon that the products of the distillation are mainly oily and etherial in their nature, and the least possible quantity of carbon remains in solid form in the retort, while the gas produced available for illumination is small in quantity and deficient in illuminating-power. If, on the other hand, the distillation be effected at a sufficiently high temperature to produce illuminating-gas of the best quality usually obtained at gas-works, a much less quantity of carbon passes from the retort in combination with the hydrogen, and a large portion remains in the retort in solid form.

The process of manufacturing illuminating-gas in general use is to effect the distillation at the comparatively high temperature required to produce good illuminating-gas, and consequently the manufacture is attended with the loss of a large amount of carbon, which, remaining in the retort in solid form, either adheres to the retort or is valuable only as coke for fuel. Another loss occurs from the passing off of a part of the hydrogen of the coal in chemical combination with the oxygen thereof in the form of water, which is subsequently condensed, so that the hydrogen given off by the coal in this form is withheld from combining with a portion of the carbon to form illuminating-gas, and is practically lost to the manufacturer. An additional loss occurs from the combination of some of the oxygen of the coal with some of the carbon thereof in the forms of carbonic acid and carbonic oxide, which not only absorb some of the carbon, but require the employment of a large amount of of lime in the purifying process to eliminate the former from the gas. A further loss occurs in ordinary gas-making from the deficiency of hydrogen in the coal, there not being enough to combine with all the carbon in the form of illuminating-gas. Hence, even if all the hydrogen that exists in the coal were rendered available for the manufacture of illuminating-gas, there would still be a loss of carbon from the want of hydrogen to combine with it in the form of illuminating-gas, and this surplus carbon either remains in the retort or combines with a portion of the hydrogen to form liquid products which escape decomposition, and are mainly condensed at the gas-works in the form of coal-tar, which contains about as much gas-making constituents as the illuminating-gas produced, so that only about half as much illuminating-gas is produced by the ordinary process of manufacture as the gas-stock has the capacity to yield.

Although the product issuing from the retort when working at what may be termed the "gas-making temperature" is mainly illuminating-gas, water, carbonic oxide, carbonic acid, and certain oily and etherial products, the bulk of which are condensed at the gas-works in the form of water and coal-tar, I have satisfied myself that good illuminating-gas is not the primary product of the distilling process, but that it is a secondary product produced by the decomposition of the oily vapors which are first disengaged by the coal under the action of the heat, and that in the process of gas-making directly from coal, as ordinarily practiced, two operations are effected in the retort, the first, which for the sake of distinction may be called "distillation," consisting mainly of the transmutation of certain of the constituents of the coal into oily vapors containing too great a proportion of carbon to constitute illuminating-gas, and the second consisting in the change of the combination of the chemical constituents of these vapors, whereby illuminating-gas is produced accompanied with the deposit of a portion of the carbon, which change may be termed "gas-making."

Now, the objects of my invention are to reduce the loss in carbon incurred by the common process and to effect the combination of all the hydrogen existing in the coal with the carbon thereof in the form of illuminating-gas; also, at the same operation, to produce an illuminating-gas of a higher illuminating-power than is generally produced at gas-works.

To this end my invention consists of a new process of making illuminating-gas, consisting of two parts, one or both of which may be used as deemed expedient.

The first part of my invention consists in the process of distilling the coal or other gas-stock in a retort distinct and separate from that in which the gas-making is effected, and which is heated to a lower temperature than that at which the retorts for the manufacture of illuminating-gas from coal are maintained, and then passing the products of the distillation without condensation into a retort heated to a high temperature, in which they are transformed into illuminating-gas, in the presence of metallic zinc or other material capable of absorbing and fixing the oxygen contained in the vapor of water, carbonic acid, and carbonic oxide at a high temperature, so that the vapor of water passing from the gas-stock during the operation of distillation is decomposed during the operation of gas-making, the oxygen being eliminated and fixed in a compound which cannot mix mechanically with the illuminating-gas, and the hydrogen being put in a condition to combine with a portion of the carbon of the oily vapors in the form of illuminating-gas, or, in other words, being rendered available for gas-making, and also that the oxygen may be eliminated from the carbonic acid and carbonic oxide and the carbon thereof put in a condition to combine with hydrogen in the form of illuminating-gas, the result of this process being the utilization for gas-making of portions of the carbon and hydrogen which would otherwise be lost for that purpose and the production of a much larger amount of illuminating-gas than could be produced if a portion of the hydrogen of the gas-stock was permitted to escape in combination with the oxygen in the form of water and portions of the carbon in combination with oxygen in the forms of carbonic acid and carbonic oxide.

The second part of my invention consists in the process of effecting the distillation of the gas-stock in one retort and the gas-making of the product in another retort in presence of an additional quantity of steam to that obtained from the distillation of the coal, and of a material which, when at a high temperature, will absorb and fix the oxygen contained in the vapor of water, whereby all the hydrogen existing in the gas-stock is not only rendered available for gas-making, but an additional quantity is derived from the additional steam introduced sufficient to transmit the surplus carbon produced in gas-making into illuminating-gas. The introduction of steam is best effected during the distilling process, so that it becomes highly heated and thoroughly intermingled with the products of the distillation of the coal before it enters the gas-making retort. Its introduction during the distilling process is useful also in another respect. It is a well-known fact that any vapor passing from or through a substance undergoing distillation tends to carry with it the vapors of other vaporizable constituents of the substance. Hence the introduction of the steam into the distilling-retort, instead of directly into the gas-making retort, facilitates the separation of the oily vapors from the gas-stock and their transmission from the distilling-retort to the gas-making retort.

My entire new process may be practiced with a modification of the ordinary apparatus now generally used at many coal-gas works, consisting of a bench of three retorts connected with the hydraulic main, condenser, washer, lime-purifier, and gas-holder. As the construction and mode of operating with such apparatus is well known to gas-engineers, I do not deem it necessary to describe it in detail, but will describe the modifications required and the mode of using the modified apparatus. The modifications should be as follows: In place of connecting each of the three retorts with the hydraulic main by a separate pipe, the lower two retorts are connected with the upper one by discharge-pipes of the customary size, and the upper one alone is connected with the hydraulic main. The connection between the lower and upper retorts is effected at the end of the upper retort farthest from its connection with the hydraulic main, so that the products of the distillation in the lower retorts are compelled to traverse the length of the upper one before escaping, and the discharge-pipe of the upper retort must be of sufficient size to permit the free escape of the current of gas, which is about three times as great in quantity as usually issues from a single retort of the same size. The upper part of this discharge-pipe is formed in part of glass, so that the presence of water in the gas issuing from the upper retort is made sensible by the condensation of it upon the glass connection. The discharge-pipe is also fitted with a small gas-burner to enable the quality of the gas produced to be ascertained by the quality of the light it gives when burned. A steam-boiler must also be provided and connected with each of the lower retorts by means of a pipe fitted with a valve or stop-cock to regulate the discharge of steam into the retorts. Each lower retort is provided with a perforated false bottom or grating, upon which the coal can be charged, and the steam-pipe is arranged so as to direct the steam beneath the false bottom. The lower two retorts may be constructed of iron. The upper retort may of iron lined with clay; but I prefer to construct it of fire-brick material, as it is to be heated to a much higher temperature than is usually employed in gas-works. The three retorts may all be heated by one fire; but the flues must be arranged in such manner as to permit the lower two retorts to be maintained at a low red heat—say from 700° to 800° Fahrenheit—while the upper one is maintained at a white heat—say 2,500° Fahrenheit or more. The regulation of the heat may be effected by means of fire-brick dampers or in any other suitable mode. The lower two retorts thus arranged constitute the distilling-retorts for my process and the upper one constitutes the gas-making retort.

The apparatus thus modified is operated as follows: Metallic zinc is charged into the upper retort, coal is charged in the ordinary manner upon the false bottoms to the lower retorts, and the retorts are closed in the ordinary way. The coal, being heated to the temperature of distillation, gives off certain products, the bulk of which is the vapors of liquids, which, passing into the more highly-heated gas-making retort, are there changed by the heat in presence of the vapors of the zinc, which, having a high affinity for oxygen, decomposes the vapor of water, absorbs and fixes its oxygen, and liberates the hydrogen to permit it to enter into combination with the carbon present in the vapors entering from the distilling-retorts. The vapor of the zinc also decomposes such carbonic oxide and carbonic acid as may be produced by the distillation, absorbs their oxygen, and puts their carbon in a condition to combine with hydrogen. If the gas-stock used be cannel-coal, the product of the distillation in the distilling-retorts may be represented with sufficient accuracy for practical purposes by the chemical formula $C_{21}H_9+CH_2+HO+CO_2+CO$, which represents a mixture of the vapors of liquid hydrocarbons, light carbureted hydrogen, vapor of water, carbonic acid, and carbonic oxide. These, in presence of the volatized zinc, (Zn,) and under the high temperature, are transformed, and the changes produced may be represented by the equation $C_{21}H_9+CH_2+HO+CO_2+CO+4Zn=12C_2H+4ZnO$—that is to say, the four equivalents of oxygen (from the water, the carbonic acid, and the carbonic oxide) combine with four equivalents of zinc to form oxide of zinc, while the twenty-four equivalents of carbon combine with twelve equivalents of hydrogen to form twelve of acetylene, ($C_2H$,) which is an illuminating-gas of the highest light-producing power. If an additional quantity of hydrogen be supplied, so that the twenty-four equivalents of carbon may combine with twenty-four of hydrogen, olefiant gas is produced, which is the illuminating-gas most highly valued by gas-manufacturers. This result may be accomplished by the admission of steam into the distilling-retorts by means of the pipes and stop-cocks provided for that purpose, as before described, so that the steam mingles with the volatile products given off by the coal during distillation and enters the gas-making retort with them. Its oxygen is there absorbed by combination with an additional quantity of the zinc to form oxide of zinc, while its hydrogen is placed in a condition to combine with the carbon of the products of the distillation of the coal. In order to insure the operation, the steam should be superheated, before its introduction into the distilling-retorts, by causing it to pass through a heated pipe.

From the foregoing description it appears that the quantity of the illuminating-gas produced depends upon the quantity of steam admitted. If more than the quantity required to transform the carbon into olefiant gas be admitted, the illuminating-gas will be deficient in illuminating-power, and the steam may, under certain circumstances, escape decomposition by the zinc and issue from the upper retort mechanically mixed with the illuminating-gas. It is therefore important that the operator should have the means of regulating the quantity of steam and of determining how much is required. The first of these two is furnished by the valves on the steam-pipes, the second by the test-burner and the glass portion of the discharge-pipe of the gas-making retort or the accumulation of water in the hydraulic main or its escape therefrom. If the steam be admitted in too large quantities the illuminating-power of the gas, as shown at the test-burner, is impaired, and the steam-valves are to be partially closed, or wholly if necessary, toward the close of the operation, when the gas-stock is exhausted; and if any steam escape decomposition, it is made sensible by condensation at the glass portion of the discharge-pipe or in the hydraulic main. The operations of distillation and gas-making proceed until the quality of the light at the test-burner shows that the gas-stock is exhausted, when the distilling-retorts are opened, the residuum withdrawn, and new charges of gas-stock are introduced, as before. The oxide of zinc requires to be withdrawn from the gas-making retort and from the discharge-pipe, where it sometimes lodges, at intervals, and fresh quantities of zinc must be charged into the upper retort. The oxide of zinc thus produced may be sold for paint or may be treated as zinc ore for the manufacture of metallic zinc, and the zinc so recovered may be used over again in the gas-making retort. As the zinc is always present in excess in the gas-making retort, a portion of its vapor passes off with the gas. This portion is condensed in the discharge-pipe leading upward to the hydraulic main, and runs back into the gas-making retort; and if the discharge-pipe does not prove on trial to be sufficiently long to condense all the vapor of zinc thus escaping, it should be made longer. The gas produced passes into the hydraulic main of the gas-works, and is treated in all respects, as to purification, &c., like ordinary coal-gas; but the lime required in the lime-purifiers is less in quantity than is required for ordinary coal-gas, as little or no carbonic acid escapes with the gas. The residuum remaining in the distilling-retorts, if the process be conducted carefully, is almost wholly earthy matter. As, however, the fuel generally used in gas-works is coke produced by the operation, it may frequently be advantageous to conduct the manufacture by my process in such manner as to produce sufficient coke to serve as fuel in the gas-works. This result may be obtained by stopping the admission of steam at some predetermined stage in the operation which may be found by trial sufficient. Thus, for example, if the process required a period of four hours for the complete exhaustion of the gas-stock, the steam may only be admitted during a portion of this period—say three hours. Then, upon opening the distilling-retorts at the end of the four hours, a certain quantity of coke will be found in them, and if this quantity be less or more than the average required for gas-making a charge of coal, the stage at which the admission of steam is stopped for succeeding charges may be made earlier or later in the operation. The manufacturer therefore has it in his power to regulate the production of coke by regulating the admission of steam during the operation.

I have thus described the complete process as applied to the manufacture of illuminating-gas from cannel-coal as the gas-stock; but the process is applicable with advantage to other gas-stock—as, for example, wood, peat, asphaltum, and solid and liquid hydrocarbons, such as the fats, oils, and petroleums. In case the solid hydrocarbons are liquefiable either by heat or by heat and solution in the liquid hydrocarbons, they should be reduced to the liquid form before their introduction into the distilling-retort, and fed to it by means of a feed-pipe and valve of the same description as is used for feeding oils in the manufacture of oil-gas. The liquid hydrocarbons should be fed in the same manner.

I have also described the process as practiced with two distilling and one gas-making retort, because this mode is adapted to the ordinary arrangement of coal-gas works with the least change of the apparatus; but the number of distilling-retorts and of gas-making retorts is a matter of expediency, and may be varied to suit particular circumstances, all that is essential in respect to number being that there shall be at least one distilling-retort and at least one gas-making retort working in connection.

I have also described the employment of zinc as the material for eliminating and fixing the oxygen of the vapor of water and other compounds of oxygen; but the invention is not limited to the use of this material, as manganese or other material having the requisite affinity at a high heat for oxygen to eliminate it from the gaseous compounds of oxygen present in the gas-making retort and fix it so that it cannot mix mechanically with the illuminating-gas delivered in the gas-holder may be used for the purpose.

I have also described the introduction of the additional quantity of steam as effected in the distilling-retort. It may, however, be introduced into the gas-making retort, instead of into the distilling-retort; but in this case it should be highly heated by being caused to pass through pipes heated to the highest red heat, or, better, to a white heat, before it enters the gas-making retort, so that it may not reduce the heat of the latter. It should also be arranged to enter with the products of the distillation, so as to be intimately mingled with them.

Having thus described my complete invention, I deem it proper to state that the first part of my invention may be used without using the second whenever circumstances may render such use advantageous. The illuminating-gas produced by my process, being richer in carbon than the ordinary coal-gas made at gas-works, has a higher illuminating-power and is more valuable to the consumer.

Having thus described one mode of practicing my entire invention, what I claim, and desire to secure by Letters Patent, is—

1. The process of manufacturing illuminating-gas by distilling the gas-stock in one retort and converting the volatile product of the distillation into illuminating-gas in another retort in the presence of a material which, when at a high temperature, will absorb and fix the oxygen contained in the volatile product of the distillation, the process being conducted substantially as set forth.

2. The process of manufacturing illuminating-gas by distilling the gas-stock in one retort and converting the volatile product of the distillation into illuminating-gas in another retort in the presence of an additional quantity of steam to that obtained from the gas-stock, and of a material which will absorb and fix the oxygen contained in the volatile product of the distillation and in the additional steam, the process being conducted substantially as set forth.

In witness whereof I have hereunto set my hand.

WILLIAM ELMER.

Witnesses:
 E. S. RENWICK,
 W. L. BENNEM.